United States Patent
Yu et al.

(10) Patent No.: US 10,012,788 B2
(45) Date of Patent: Jul. 3, 2018

(54) DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yangbing Yu, Beijing (CN); Weihao Hu, Beijing (CN); Daekeun Yoon, Beijing (CN); Yanping Liao, Beijing (CN); Xibin Shao, Beijing (CN); Rui Guo, Beijing (CN); Weijie Zhao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 310 days.

(21) Appl. No.: 14/769,240

(22) PCT Filed: Oct. 1, 2014

(86) PCT No.: PCT/CN2014/088086
§ 371 (c)(1),
(2) Date: Aug. 20, 2015

(87) PCT Pub. No.: WO2016/015381
PCT Pub. Date: Feb. 4, 2016

(65) Prior Publication Data
US 2016/0245984 A1 Aug. 25, 2016

(30) Foreign Application Priority Data
Jul. 31, 2014 (CN) .......................... 2014 1 0373743

(51) Int. Cl.
*F21V 7/04* (2006.01)
*F21V 8/00* (2006.01)
(Continued)

(52) U.S. Cl.
CPC ......... *G02B 6/0055* (2013.01); *G02B 3/0056* (2013.01); *G02B 3/0068* (2013.01);
(Continued)

(58) Field of Classification Search
CPC .. G02B 6/0055; G02B 3/0056; G02B 3/0068; G02B 6/00; G02B 6/0031; G02B 6/0053; G02B 6/0068; G02B 27/0101
(Continued)

(56) References Cited

U.S. PATENT DOCUMENTS

| 8,325,297 B2 | 12/2012 | Uehara et al. |
| 2005/0276071 A1 | 12/2005 | Sasagawa et al. |

(Continued)

FOREIGN PATENT DOCUMENTS

| CN | 1678943 A | 10/2005 |
| CN | 101290428 A | 10/2008 |

(Continued)

OTHER PUBLICATIONS

Second Chinese Office Action dated Aug. 15, 2016; Appln. No. 201410373743.3.

(Continued)

*Primary Examiner* — Elmito Breval
*Assistant Examiner* — Jessica M Apenteng
(74) *Attorney, Agent, or Firm* — Ladas & Parry LLP

(57) ABSTRACT

A display device includes a display panel, a light guide plate, a first light source and a second light source. The display panel is provided with a plurality of pixel units arranged in an array, the light guide plate includes a first reflection structure and a second reflection structure. The first reflection structure reflects light emitted from the first light source to the pixel units of the display unit and the light is guided to a first view side after passing through the display panel. The second reflection structure reflects light emitted from the second light source to the pixel units of the display panel and the light is guided to a second view side after passing (Continued)

through the display panel. The above display panel is capable of achieving naked eye dual vision display without wearing dedicated glasses.

20 Claims, 3 Drawing Sheets

(51) Int. Cl.
- *G02B 6/00* (2006.01)
- *G02B 3/00* (2006.01)
- *G02B 27/01* (2006.01)

(52) U.S. Cl.
CPC ............. *G02B 6/00* (2013.01); *G02B 6/0031* (2013.01); *G02B 6/0053* (2013.01); *G02B 6/0068* (2013.01); *G02B 27/0101* (2013.01)

(58) Field of Classification Search
USPC ......................................................... 362/606
See application file for complete search history.

(56) References Cited

U.S. PATENT DOCUMENTS

| | | |
|---|---|---|
| 2010/0157577 A1 | 6/2010 | Montgomery et al. |
| 2012/0099215 A1 | 4/2012 | Wu |
| 2012/0105767 A1 | 5/2012 | Choi et al. |
| 2012/0294029 A1 | 11/2012 | Wu et al. |
| 2015/0226972 A1 | 8/2015 | Wang |
| 2015/0331168 A1 | 11/2015 | Wang |

FOREIGN PATENT DOCUMENTS

| | | |
|---|---|---|
| CN | 101542191 A | 9/2009 |
| CN | 101750772 A | 6/2010 |
| CN | 202056688 A | 11/2011 |
| CN | 103091854 A | 5/2013 |
| CN | 103412411 A | 11/2013 |
| CN | 103838034 A | 6/2014 |
| CN | 103995312 A | 8/2014 |
| WO | 2011/134414 A1 | 11/2011 |

OTHER PUBLICATIONS

International Search Report & Written Opinion of the International Searching Authority Appln. No. PCT/CN2014/088086; dated May 4, 2015.

First Chinese Office Action dated Jan. 14, 2016; Appln. No. 201410373743.3.

DISPLAY DEVICE

TECHNICAL FIELD

Embodiments of the present invention relate to a display device.

BACKGROUND

Dual vision display technology is a technology by which two different information contents can be displayed on a same one display device. The dual vision display technology is more and more widely used, for example, in an vehicle-mounted display by which the driver may obtain navigation information and the person on the passenger seat can watch videos, or for example used at home by which the adult may watch news program while the kids may watch cartoons, and so on.

SUMMARY

At least one embodiment of the present invention relates a display device capable of achieving naked eye dual vision display.

At least one embodiment of the present invention provides a display device including a display panel, a light guide plate, a first light source and a second light source. The display panel is provided with a plurality of pixel units arranged in an array; the light guide plate is located at a light entrance side of the display panel and the light guide plate has a first reflection structure and a second reflection structure; the first reflection structure directs light emitted from the first light source to the pixel units of the display panel, and the light is further guided to a first view side after passing through the display panel; the second reflection structure directs light emitted from the second light source to the pixel units of the display panel, and the light is guided to a second view side after passing through the display panel.

In an embodiment, the light guide plate is formed with a plurality of first reflection faces and a plurality of second reflection faces on a side facing away from the display panel, and the first reflection faces and the second reflection faces are alternately provided. The first reflection faces form the first reflection structure, and the second reflection faces form the second reflection structure.

In an embodiment, the plurality of pixel units of the display panel includes a plurality columns of even column pixel units and a plurality columns of odd column pixel units spaced from each other in a row direction; the first reflection faces formed by the light guide plate correspond to the odd column pixel units of the display panel one by one, and each of the first reflection faces guides the light emitted from the first light source to corresponding odd column pixel units; the second reflection faces formed by the light guide plate correspond to the even column pixel unit of the display panel one by one, and each of the second reflection faces guides the light emitted from the second light source to corresponding even column pixel unit.

In an embodiment, in two opposite side surfaces of the light guide plate, one side surface forms a first light entrance side surface, and the other side surface forms a second light entrance side surface, and each of the side surfaces is parallel with the column direction of the pixel units of the display panel and perpendicular to the light entrance side of the display panel. The first light source is located at the first light entrance side surface of the light guide plate, and the second light source is located at the second light entrance side surface of the light guide plate.

In an embodiment, the side surface of the light guide plate facing away from the display panel is formed with a plurality of micro-structure prism grooves, each of the micro-structure prism grooves has its length direction parallel with the column direction of the pixel units of the display panel, and each of the micro-structure prism grooves comprises one of the first reflection faces and one of the second reflection faces.

In an embodiment, the refraction index n of the light guide plate is 1.49~1.53, and along a direction perpendicular to the display panel, the depth h of each of the micro-structure prism grooves meets $10\ \mu m \leq h \leq 50\ \mu m$, and in each of the micro-structure prism grooves, the first reflection face and the second reflection face form an angle $\alpha$ from 110 degree to 130 degree therebetween.

In an embodiment, the first light source include a plurality of light emitting diode (LED) lamps and a reflection device, the reflection device has an opening towards the light guide plate and an inner surface forming an arch-shaped reflection cavity; each of the LED lamps is located at a center axis of the reflection cavity and emits light in a direction facing away from the opening of the reflection cavity.

In an embodiment, the display device further includes a dual vision display refraction film located between the light guide plate and the display panel; wherein a side surface of the dual vision refraction film facing the light guide plate is formed with a plurality of first refraction faces, to guide the light guided outside of the light guide plate after being reflected by the first reflection face into the dual vision display refraction film; a side surface of the dual vision display refraction film facing the light guide plate is formed with a plurality of second refraction faces, to guide the light guided outside of the light guide plate after being reflected by the second reflection face into the dual vision display refraction film; a side surface of the dual vision display refraction film facing the display panel is formed with a plurality of arc-shaped protrusions arranged along the row direction of the pixel units of the display panel; in the row direction of the pixel units of the display panel, each of the arc-shaped protrusions has a width larger than or equal to a width of the pixel unit; the light reflected by each of the first reflection face is introduced into the corresponding pixel unit by being refracted by the arc-shaped protrusions after being introduced into the dual vision display refraction film through the first refraction face, and the light reflected by each of the second reflection face is introduced into the corresponding pixel unit by being refracted by the arc-shaped protrusions after being introduced into the dual vision display refraction film through the first refraction face.

In an embodiment, in the row direction of the pixel units of the display panel, a projection of an intersection line between any two adjacent arc-shaped protrusions on the display panel is coincident with a central line of one column of the pixel units, and a diameter of the arc face of each of the arc-shaped protrusions is larger than or equal to the width of the pixel unit. Each of the pixel unit has at least three sub-pixel units, and in the column direction of the pixel units of the display panel, a central line of an arc face of the arc-shaped protrusion is offset from a vertical angle line of the triangular protrusion by a width of at least one sub-pixel unit.

In an embodiment, in the dual vision display refraction film, the angle formed between any two adjacent first refraction face and second refraction face is from 100 degree to 120 degree.

DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
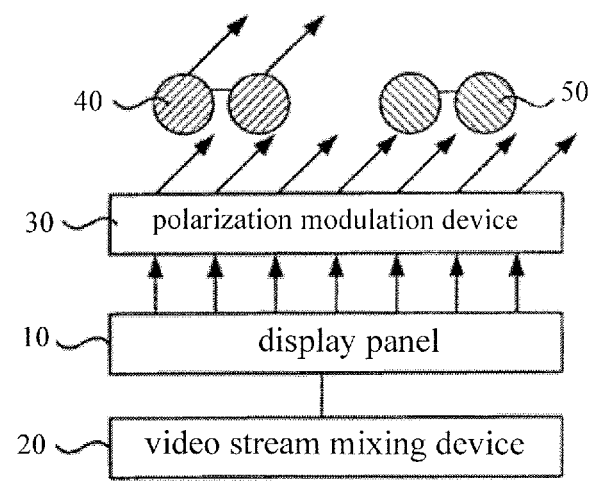
FIG. 1 is a schematic structure view showing the principle of a display device in dual vision display mode.

FIG. 1 shows a display device having dual vision display function. As shown in FIG. 1, the dual vision display device includes: a display panel, a video stream mixing device 20, and a polarization modulation device 30 located at light outgoing side of the display panel. At least two pairs of glasses need to be prepared for viewers to watch the dual vision display device. For convenience of description, it is supposed that the glasses 40 are left polarization glasses and the glasses 50 are right polarization glasses.

The display panel 10 is switched periodically according to the video stream input into the display panel 10 from the video stream mixing device 20 or array-regionally spaced, to display two kinds of pictures. If the polarization direction of the polarization modulation device 30 is identical with the polarization direction of the glasses 40, the viewer wearing the glasses 40 can watch one of the pictures displayed by the display panel; if the polarization direction of the polarization modulation device 30 is identical with the polarization direction of the glasses 50, the viewer wearing the glasses 50 can watch another picture displayed by the display panel. But when the display device operations to realize dual vision effect, it is necessary to wear different glasses for the different viewers, naked eye dual vision can not be achieved.

Figure 2:
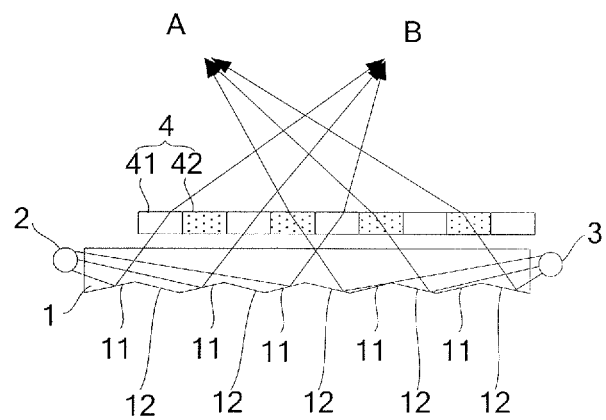
FIG. 2 is a schematic structure view showing the display device provided by an embodiment of the present invention.

FIG. 2 is a schematic structure view showing a display device provided by an embodiment of the present invention.

As shown in FIG. 2, the display device provided by the embodiment of the present invention includes: a display panel 4, a light guide plate 1, a first light source 2 and a second light source 3.

The display panel 4 is provided with a plurality of pixel units arranged in an array, such as the pixel units 41 and the pixel units 42 arrange alternately. Here, for the display time of any two adjacent frame, in one frame display time, the first light source 2 emits light and the second light source 3 is turned off. In another frame display time, the second light source 3 emits light and the first light source 2 is turned off. The light guide plate 1 is located at the light entrance side of the display panel 4, and the light guide plate 1 has a first reflection structure and a second reflection structure. Light emitted by the first light source 2 is reflected by the first reflection structure to the pixel units of the display panel 4, and after passing through the display panel 4, is guided to a first view side, as shown at B side of FIG. 2; and light emitted from the second light source 3 is reflected by the second reflection structure to the pixel units of the display panel 4, and after passing through the display panel 4, is guided to a second view side, as shown at A side of FIG. 2.

When the above display device is operating to display, for any two adjacent frame display time, in one of the frame display time, the first light source 2 emits light and the second light source 3 is turned off, the first reflection structure included in the light guide plate 1 can reflect the light emitted from the first light source 2 when the first light source 2 emits light to the pixel units of the display panel 4, and allows the light to be emitted to the first view side after passing through the display panel 4, so that the viewer at the first view side can watch one of the pictures displayed by the display panel 4 in this frame display time; accordingly, at this time, since the second light source 3 is turned off, the viewer at the second view side will watch a frame of black picture displayed by the display panel 4. In another frame display time, the second light source 3 emits light and the first light source 2 is turned off, the second reflection structure reflects the light emitted from the second light source 3 to the pixel units of the display panel 4, and allows the light to be emitted to the second view side after passing through the display panel, so that the viewer at the second view can watch the picture displayed by the display panel 4 in the frame display time; accordingly, at this time, the viewer at the first view side can only watch a frame of black picture displayed by the display panel 4.

Therefore, the above display device is capable of achieving naked eye dual vision with the first reflection structure and the second reflection structure provided in the light guide plate and by controlling the first light source 2 and the second light source 3 without wearing dedicated glasses.

Further referring to FIG. 2, the light guide plate 1 of the present embodiment has the first reflection structure and the second mechanism, and will be described in detail below. The side of the light guide plate 1 facing away from the display panel 4 is formed with a plurality of first reflection faces 11 and a plurality of second reflection faces 12, the first reflection faces 11 and the second reflection faces 12 are alternately provided; the first reflection faces 11 form the first reflection structure and the second reflection faces 12 form the second reflection structure.

Further referring to FIG. 2, the plurality of pixel units of the display panel 4 of the present embodiment include a plurality columns of even column pixel units 42 and a plurality columns of odd column pixel units 41 arranged separately in a row direction; the first reflection faces 11 formed by the light guide plate 1 correspond to the odd column pixel units 41 of the display panel 4 one by one, and each of the first reflection faces 11 reflects the light emitted by the first light source 2 to its corresponding odd column pixel units 41. The second reflection faces 12 formed by the light guide plate 1 correspond to the even column pixel units 42 of the display panel 4 one by one, and each of the second reflection faces 12 reflects the light emitted by the second light source 3 to its corresponding even column pixel units 42.

The display device having the above structure according to the present embodiment of the present invention is capable of achieving naked eye dual vision display.

Figure 3:
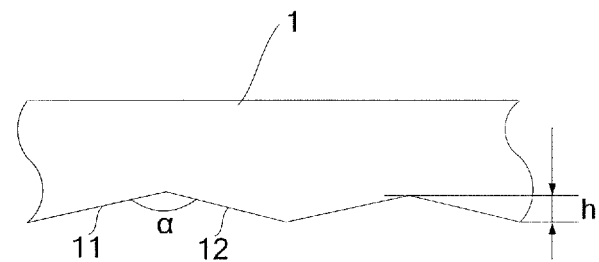
FIG. 3 is a schematic structure view showing the structure of a light guide panel in the display device provided by an embodiment of the present invention.

As shown in FIG. 2 and FIG. 3, in one preferred embodiment, of the opposite side surfaces of the light guide plate 1, one side surface forms a first light entrance side surface and the other side surface forms a second light entrance side surface, and each of the side surfaces is parallel with the column direction of the pixel units of the display panel 4 while is perpendicular to the light entrance side of the display panel 4. The first light source 2 is located at the first light entrance side surface of the light guide plate 1, and the second light source 3 is located at the second light entrance side surface of the light guide plate 1. The arrangement of the first light source 2 and the second light source 3 corresponds to the first reflection face 11 and the second reflection face 12.

As shown in FIG. 2 and FIG. 3, a side surface of the light guide plate 1 facing away from the display panel 4 is formed with a plurality of micro-structure prism grooves, the lengthwise direction of each of the micro-structure prism grooves is parallel with the column direction of the pixel units of the display panel 4, and each of the micro-structure prism grooves comprises one of the first reflection faces 11 and one of the second reflection faces 12.

In one embodiment, in the above light guide plate 1, the refraction index n of the light guide plate 1 is 1.49 to 1.53, for example, 1.49, 1.50, 1.51, 1.53, and so on. As shown in FIG. 3, along the direction perpendicular to the display panel 4, each of the micro-structure prism grooves has depth h ranging 10 μm≤h≤50 μm, e.g., 10 μm, 15 μm, 20 μm, 30 μm, 35 μm, 40 μm, 45 μm, 50 μm, and so on.

For example, in each of the micro-structure prism grooves, the first reflection face 11 and the second reflection face 12 form an angle α between 110 degree and 130 degree, such as 110 degree, 115 degree, 120 degree, 125 degree, or 130 degree.

Figure 6:
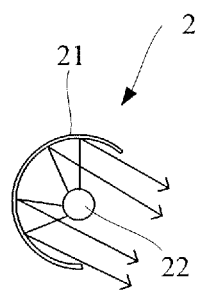
FIG. 6 is a schematic structure view showing the structure of a first light source in the display device provided by an embodiment of the present invention.

As shown in FIG. 6, based on the above embodiment, for example, the first light source 2 includes a plurality of LED lamps 22 and a reflection device 21, the reflection device 21 has an opening towards the light guide plate 1 and an inner surface formed as an arc-shaped reflection cavity. Each of the LED lamps 22 is located at central axis of the reflection cavity of the reflection device 21, and emits light along a direction facing away from the opening of the reflection cavity.

As shown in FIG. 6, in the above structure of the first light source 2, light emitted from each of the LED lamps 22 is reflected by the inner surface of the reflection cavity into parallel light, and thus forms the first light source 2 into a parallel light source 2, so that the light emitted by the first light source 2 is incident onto the first reflection face 11 of each of the micro-structure prism grooves at a constant angle.

The second light source 3 has the same the structure and effect, and redundant description will not be further repeated.

Figure 4:
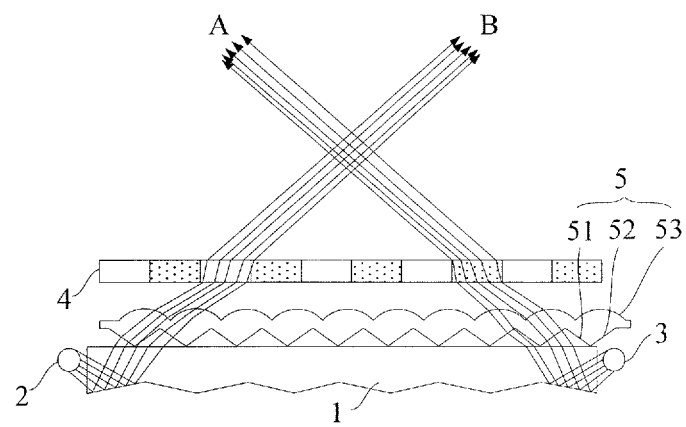
FIG. 4 is a schematic structure view showing the display device provided by another embodiment of the present invention.

Referring to FIG. 4, the display device provided by an embodiment of the present invention further includes a dual vision display refraction film 5 located between the light guide plate 1 and the display panel 4.

For example, the side surface of the dual vision display refraction film 5 facing the light guide plate 1 is formed with a plurality of first refraction faces 51 to direct the light exited from the light guide plate 1 after being reflected by the first reflection face 11 into the dual vision display refraction film 5; the side surface of the dual vision display refraction film 5 facing the light guide plate 1 is formed with a plurality of second refraction faces 52, to direct the light exited from the light guide plate 1 after being reflected by the second reflection faces 12 into the dual vision display refraction film 5. A side surface of the dual vision display refraction film 5 facing the display panel 4 is formed with a plurality of arc-shaped protrusions 53 arranged along the row direction of the pixel units of the display panel 4; along the row direction of the pixel units of the display panel 4, the width of each of the arc-shaped protrusions is larger than or equal to the width of the pixel unit. The light after being reflected by each of the first reflection faces 11 is directed into the dual vision display refraction film 5 through the first refraction faces 51, and then after being refracted by the arc-shaped protrusions 53, is directed into the corresponding pixel unit; the light after being reflected by each of the second reflection faces 13 is directed into the dual vision display refraction film 5 through the second refraction faces 52, and then after being refracted by the arc-shaped protrusions 53, is directed into the corresponding pixel unit.

As shown in FIG. 4, the dual vision display refraction film 5 can converge the light exit from the light guide plate 1 after being reflected by each of the first reflection faces 11 and the second reflection faces 12 into the corresponding pixel units, and thus can reduce the cross-talk phenomenon when the display device performs dual vision displaying operation, and improve the display effect of the display device in performing dual vision displaying operation.

Figure 5:
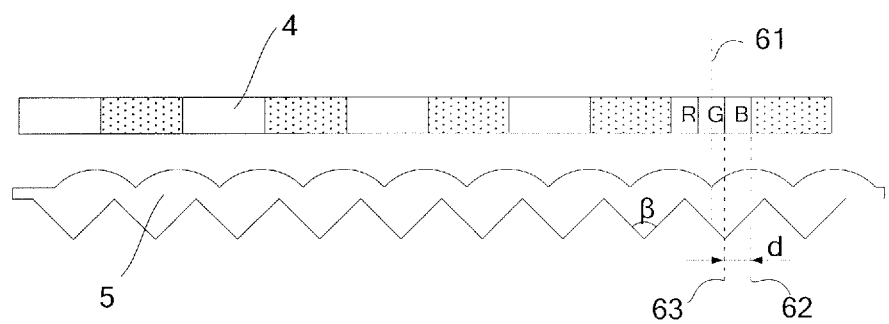
FIG. 5 is a schematic view showing the relative position between a dual vision display refraction film and a display panel in the display device in FIG. 4.

For example, as shown in FIG. 5, along the row direction of the pixel units of the display panel 4, the projection of an intersection line between any two adjacent arc-shaped protrusions 53 on the display panel 4 is coincided with the central line 61 of one column pixel units, and the arc-shaped face of each of the arc-shaped protrusions 53 has diameter larger than or equal to the width of the pixel unit. Each of the pixel units includes at least three sub-pixel units, as shown in FIG. 5, for example, each of the pixel units has three sub-pixel units, and along the row direction of the pixel units of the display panel 4, the central line 62 of the arc-shaped face of the arc-shaped protrusion is offset from the vertical angle line 63 of the triangular protrusion by an offset width d, which is at least the width of one sub-pixel unit.

In the display device having the above structure, when the first light source 2 emits light, the light reflected by the first reflection faces 11 is incident into each column of the pixel units, and when the second light source 3 emits light, the light reflected by the second reflection faces 12 is incident into each column of the pixel units. Therefore, with the display device having the above structure, when the viewers at the first view side and at the second view side are watching the pictures, all the pixel units in the display panel 4 can used to display, the resolution of the display panel 4 when displaying the picture for the viewer at the first view side and the picture for the viewer at the second view side can be improved.

In a preferred embodiment of the present invention, in the dual vision display refraction film, any two adjacent first refraction face and second refraction face form a angle β ranging from 100 degree to 120 degree.

The present disclosure has been described above by way of the exemplary embodiment, and the protection scope of the present disclosure would not be limited therein, and is only defined by the following claims.

The present application claims the priority of Chinese Patent Application No. 201410373743.3 filed on Jul. 31, 2014, the disclosure of which is entirely incorporated by reference herein as a part of the present application.

What is claimed is:

1. A display device comprising: a display panel, a light guide plate, a first light source and a second light source,
wherein the display panel is provided with a plurality of pixel units arranged in an array;
the light guide plate is located at a light entrance side of the display panel and the light guide plate has a first reflection structure and a second reflection structure;
the first reflection structure directs light emitted from the first light source to the pixel units of the display panel, and the light is further guided to a first view side after passing through the display panel; and
the second reflection structure directs light emitted from the second light source to the pixel units of the display panel, and the light is guided to a second view side after passing through the display panel;
the plurality of pixel units of the display panel comprises a plurality columns of even column pixel units and a plurality columns of odd column pixel units spaced from each other in a row direction;
the plurality columns of odd column pixel units correspond to the first reflection structure which guides the light emitted from the first light source to corresponding odd column pixel units; and
the plurality columns of even column pixel units correspond to the second reflection structure which guides the light emitted from the second light source to corresponding even column pixel units.

2. The display device according to claim 1, wherein the light guide plate is formed with a plurality of first reflection faces and a plurality of second reflection faces on a side facing away from the display panel, and the first reflection faces and the second reflection faces are alternately provided, and the first reflection faces form the first reflection structure, and the second reflection faces form the second reflection structure.

3. The display device according to claim 2, wherein, between the first light source and the second light source, for any two adjacent frame display time, in one frame display time, the first light source emits light and the second light source is turned off, and in another frame display time, the second light source emits light and the first light source is turned off.

4. The display device according to claim 2, wherein in two opposite side surfaces of the light guide plate, one side surface forms a first light entrance side surface, and the other side surface forms a second light entrance side surface, and each of the side surfaces is parallel with a column direction of the pixel units of the display panel and perpendicular to the light entrance side of the display panel, and
the first light source is located at the first light entrance side surface of the light guide plate, and the second light source is located at the second light entrance side surface of the light guide plate.

5. The display device according to claim 4, further including a dual vision display refraction film located between the light guide plate and the display panel;
wherein a side surface of the dual vision refraction film facing the light guide plate is formed with a plurality of first refraction faces, to guide light exiting from the light guide plate after being reflected by the first reflection face into the dual vision display refraction film;
a side surface of the dual vision display refraction film facing the light guide plate is formed with a plurality of second refraction faces, to guide light exiting from the light guide plate after being reflected by the second reflection face into the dual vision display refraction film;
a side surface of the dual vision display refraction film facing the display panel is formed with a plurality of arc-shaped protrusions arranged along a row direction of the pixel units of the display panel;
in the row direction of the pixel units of the display panel, each of the arc-shaped protrusions has a width larger than or equal to a width of the pixel unit;
the light reflected by each of the first reflection face is introduced into the corresponding pixel unit by being refracted by the arc-shaped protrusions after being introduced into the dual vision display refraction film through the first refraction face, and the light reflected by each of the second reflection face is introduced into the corresponding pixel unit by being refracted by the arc-shaped protrusions after being introduced into the dual vision display refraction film through the first refraction face.

6. The display device according to claim 5, wherein in the row direction of the pixel units of the display panel, a projection of an intersection line between any two adjacent arc-shaped protrusions on the display panel is coincident with a central line of one column of the pixel units, and a diameter of the arc face of each of the arc-shaped protrusions is larger than or equal to the width of the pixel unit;
each of the pixel unit has at least three sub-pixel units, and in the column direction of the pixel units of the display panel, a central line of an arc face of the arc-shaped protrusion is offset from a vertical angle line of the triangular protrusion by a width of at least one sub-pixel unit.

7. The display device according to claim 6, wherein in the dual vision display refraction film, an angle formed between any two adjacent first refraction face and second refraction face is from 100 degree to 120 degree.

8. The display device according to claim 4, wherein, between the first light source and the second light source, for any two adjacent frame display time, in one frame display time, the first light source emits light and the second light source is turned off, and in another frame display time, the second light source emits light and the first light source is turned off.

9. The display device according to claim 4, wherein a side surface of the light guide plate facing away from the display panel is formed with a plurality of micro-structure prism grooves, each of the micro-structure prism grooves has its length direction parallel with the column direction of the pixel units of the display panel; and
each of the micro-structure prism grooves comprises one of the first reflection faces and one of the second reflection faces.

10. The display device according to claim 9, wherein a refraction index n of the light guide plate is from 1.49 to 1.53;

along a direction perpendicular to the display panel, a depth h of each of the micro-structure prism grooves ranges 10 µm≤h≤50 µm; and in each of the micro-structure prism grooves, the first reflection face and the second reflection face form an angle α of 110 degree to 130 degree therebetween.

11. The display device according to claim 10, wherein, the first light source include a plurality of light emitting diode (LED) lamps and a reflection device, the reflection device has an opening towards the light guide plate and an inner surface forming an arch-shaped reflection cavity;

each of the LED lamps is located at a center axis of the reflection cavity and emits light in a direction facing away from the opening of the reflection cavity.

12. The display device according to claim 1, wherein, between the first light source and the second light source, for any two adjacent frame display time, in one frame display time, the first light source emits light and the second light source is turned off, and in another frame display time, the second light source emits light and the first light source is turned off.

13. A display device comprising: a display panel, a light guide plate, a first light source and a second light source;

wherein the display panel is provided with a plurality of pixel units arranged in an array; the light guide plate is located at a light entrance side of the display panel and the light guide plate has a first reflection structure and a second reflection structure;

the first reflection structure directs light emitted from the first light source to the pixel units of the display panel, and the light is further guided to a first view side after passing through the display panel; and the second reflection structure directs light emitted from the second light source to the pixel units of the display panel, and the light is guided to a second view side after passing through the display panel;

the light guide plate is formed with a plurality of first reflection faces and a plurality of second reflection faces on a side facing away from the display panel, and the first reflection faces and the second reflection faces are alternately provided, and the first reflection faces form the first reflection structure, and the second reflection faces form the second reflection structure;

the plurality of pixel units of the display panel comprises a plurality columns of even column pixel units and a plurality columns of odd column pixel units spaced from each other in a row direction;

the first reflection faces formed by the light guide plate correspond to the odd column pixel units of the display panel one by one, and each of the first reflection faces guides the light emitted from the first light source to corresponding odd column pixel units;

the second reflection faces formed by the light guide plate correspond to the even column pixel unit of the display panel one by one, and each of the second reflection faces guides the light emitted from the second light source to corresponding even column pixel unit.

14. The display device according to claim 13, further including a dual vision display refraction film located between the light guide plate and the display panel;

wherein a side surface of the dual vision refraction film facing the light guide plate is formed with a plurality of first refraction faces, to guide light exiting from the light guide plate after being reflected by the first reflection face into the dual vision display refraction film;

a side surface of the dual vision display refraction film facing the light guide plate is formed with a plurality of second refraction faces, to guide light exiting from the light guide plate after being reflected by the second reflection face into the dual vision display refraction film;

a side surface of the dual vision display refraction film facing the display panel is formed with a plurality of arc-shaped protrusions arranged along a row direction of the pixel units of the display panel;

in the row direction of the pixel units of the display panel, each of the arc-shaped protrusions has a width larger than or equal to a width of the pixel unit;

the light reflected by each of the first reflection face is introduced into the corresponding pixel unit by being refracted by the arc-shaped protrusions after being introduced into the dual vision display refraction film through the first refraction face, and the light reflected by each of the second reflection face is introduced into the corresponding pixel unit by being refracted by the arc-shaped protrusions after being introduced into the dual vision display refraction film through the first refraction face.

15. The display device according to claim 14, wherein in the row direction of the pixel units of the display panel, a projection of an intersection line between any two adjacent arc-shaped protrusions on the display panel is coincident with a central line of one column of the pixel units, and a diameter of the arc face of each of the arc-shaped protrusions is larger than or equal to the width of the pixel unit;

each of the pixel unit has at least three sub-pixel units, and in a column direction of the pixel units of the display panel, a central line of an arc face of the arc-shaped protrusion is offset from a vertical angle line of the triangular protrusion by a width of at least one sub-pixel unit.

16. The display device according to claim 15, wherein in the dual vision display refraction film, an angle formed between any two adjacent first refraction face and second refraction face is from 100 degree to 120 degree.

17. The display device according to claim 13, wherein, between the first light source and the second light source, for any two adjacent frame display time, in one frame display time, the first light source emits light and the second light source is turned off, and in another frame display time, the second light source emits light and the first light source is turned off.

18. A display device comprising: a display panel, a light guide plate, a first light source and a second light source; and the display panel is provided with a plurality of pixel units arranged in an array; the light guide plate is located at a light entrance side of the display panel and the light guide plate has a first reflection structure and a second reflection structure;

wherein the first reflection structure directs light emitted from the first light source to the pixel units of the display panel, and the light is further guided to a first view side after passing through the display panel; and the second reflection structure directs light emitted from the second light source to the pixel units of the display panel, and the light is guided to a second view side after passing through the display panel;

the light guide plate is formed with a plurality of first reflection faces and a plurality of second reflection faces on a side facing away from the display panel, and the first reflection faces and the second reflection faces are alternately provided, and the first reflection faces form the first reflection structure, and the second reflection faces form the second reflection structure;

the display device further comprises a dual vision display refraction film located between the light guide plate and the display panel;

a side surface of the dual vision refraction film facing the light guide plate is formed with a plurality of first refraction faces, to guide light exiting from the light guide plate after being reflected by the first reflection face into the dual vision display refraction film;

a side surface of the dual vision display refraction film facing the light guide plate is formed with a plurality of second refraction faces, to guide light exiting from the light guide plate after being reflected by the second reflection face into the dual vision display refraction film;

a side surface of the dual vision display refraction film facing the display panel is formed with a plurality of arc-shaped protrusions arranged along a row direction of the pixel units of the display panel;

in the row direction of the pixel units of the display panel, each of the arc-shaped protrusions has a width larger than or equal to a width of the pixel unit;

the light reflected by each of the first reflection face is introduced into the corresponding pixel unit by being refracted by the arc-shaped protrusions after being introduced into the dual vision display refraction film through the first refraction face, and the light reflected by each of the second reflection face is introduced into the corresponding pixel unit by being refracted by the arc-shaped protrusions after being introduced into the dual vision display refraction film through the first refraction face.

19. The display device according to claim 18, wherein in the row direction of the pixel units of the display panel, a projection of an intersection line between any two adjacent arc-shaped protrusions on the display panel is coincident with a central line of one column of the pixel units, and a diameter of the arc face of each of the arc-shaped protrusions is larger than or equal to the width of the pixel unit;

each of the pixel unit has at least three sub-pixel units, and in a column direction of the pixel units of the display panel, a central line of an arc face of the arc-shaped protrusion is offset from a vertical angle line of the triangular protrusion by a width of at least one sub-pixel unit.

20. The display device according to claim 19, wherein in the dual vision display refraction film, an angle formed between any two adjacent first refraction face and second refraction face is from 100 degree to 120 degree.

* * * * *